Jan. 21, 1958  J. SAUTER  2,820,348
UTILIZING INTERMITTENTLY PRODUCED WASTE HEAT
Filed July 28, 1954
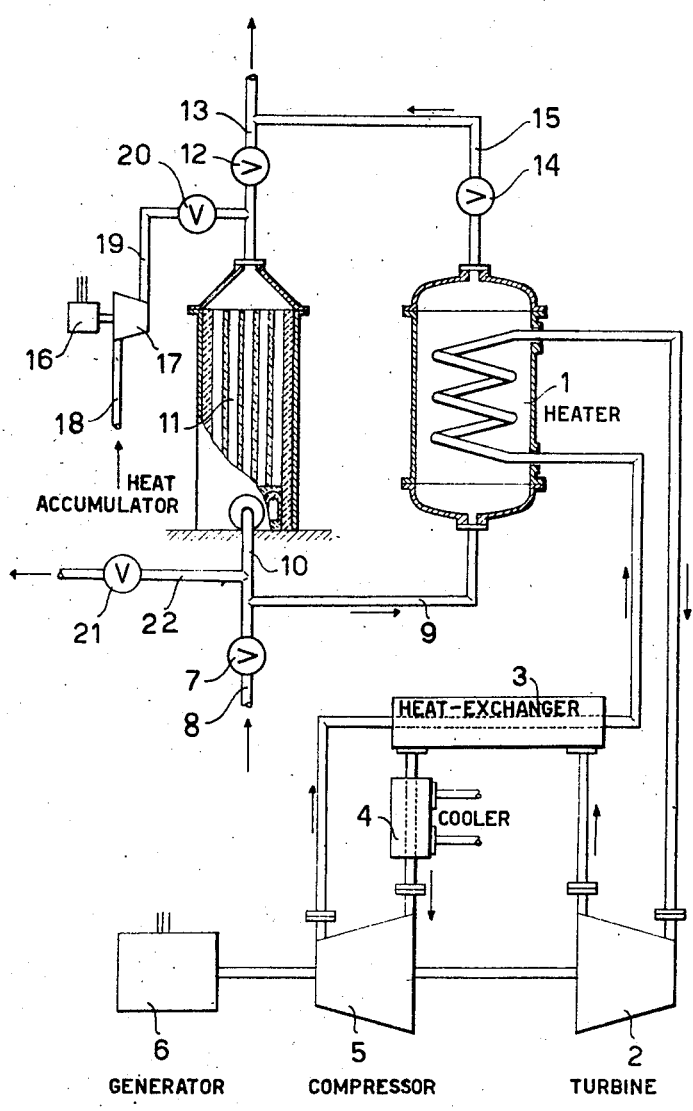
INVENTOR:
Josef Sauter
By Dodge and Sons
Attorneys

United States Patent Office 2,820,348
Patented Jan. 21, 1958

2,820,348

UTILIZING INTERMITTENTLY PRODUCED WASTE HEAT

Josef Sauter, Zurich, Switzerland, assignor to Aktiengesellschaft fuer Technische Studien, Zurich, Switzerland, a corporation of Switzerland Application July 28, 1954, Serial No. 446,226

Claims priority, application Switzerland August 11, 1953

3 Claims. (Cl. 60—59)

The invention relates to a method of utilizing heat contained in an intermittently produced heat carrier, especially in exhaust gases, in a thermal power plant, and an installation for carrying out this method.

In industrial installations, for example in the steel production field, it may occur that hot waste gases are intermittently produced as a result of a process taking place periodically. If it is desired to heat the working medium of a thermal power plant with these exhaust gases in order to utilize the waste heat contained therein, the normal storage capacity of the heater is generally insufficient to maintain operation also during the time when no waste gases are produced. On interruption of the heating gas supply, the temperature of the working medium of a gas turbine installation, for example, also falls rapidly, which results not only in a rapid fall in the power yield, but also in unfavorable thermal stressing of the materials of which the turbine is constructed.

The invention has for its object, in the utilization of heat contained in an intermittently produced heat carrier, especially in exhaust gases, in a thermal power plant, to maintain as uniform as possible a heat supply also during the time when no heat carrier is produced. For this purpose, in the method according to the invention, in the period during which this heat carrier is produced, a part thereof gives up heat to a heat accumulator, and the remaining part gives up heat to the working medium of the thermal power plant through heat exchange walls. In the period when no heat carrier is produced, on the other hand, heat is yielded by the heat accumulator to the working medium of the thermal power plant.

For the transmission of the heat from the heat accumulator to the working medium of the thermal power plant, a gaseous intermediate heat carrier, preferably atmospheric air, is employed, which is heated by the heat accumulator in the period when no heat carrier is produced, and which in turn transmits at least a part of the heat absorbed by the accumulator to the working medium of the thermal power plant through the fixed heat exchange walls.

An installation for carrying out the method according to the invention is illustrated by way of example in simplified form in the drawing, with reference to which the method will also be described.

The waste heat produced in the heat carrier is utilized in a gas turbine installation, preferably hot-air turbine installation, having a closed circuit. This thermal power plant comprises a heater 1 in which a compressed gaseous working medium is heated. This working medium then expands in a turbine 2, flows through a heat exchanger 3 and a cooler 4 after leaving this turbine, and is thereafter re-compressed to the original pressure in a compressor 5. The compressed working medium is first preheated in the heat exchanger 3 by the working medium leaving the turbine 2 and thereafter returns into the heater 1, the circuit thus being closed. The excess of the turbine output over the power absorbed by the compressor is transferred to an electric current generator 6.

A heat carrier intermittently produced by an industrial plant not shown, for example hot exhaust gases, is fed through a pipe 8 provided with a shut-off valve 7. This pipe communicates on the one hand through a pipe 9 with the heater 1 of the thermal power plant, and on the other hand through a pipe 10 with a heat accumulator 11, which contains checkerwork bricks consisting, for example, of refractory material as heat-storing material.

The heater 1 is thus a surface heat exchanger in which the heat exchange surface is afforded by the coil and the space around the coil and within the shell or housing may be called a "heat delivery path."

The accumulator 11 offers within its shell or housing a flow path which may be called a "heat recovery flow path" because the checker work recovers heat from flowing gas, or flowing gas recovers the heat from the checker work, according to the setting of flow directing valves.

In the period during which the heat carrier is produced, a part thereof is passed through the pipe 10 into the heat accumulator 11, and this part thus gives up heat to the heat accumulator and thereafter leaves it through a pipe 13 provided with a shut-off valve 12.

The remaining part of the heat carrier flows through the pipe 9 and enters the heater 1, in which this part transmits heat through the walls of the heater tubes to the working medium of the thermal power plant. It then leaves the heater through a pipe 15 provided with a shut-off valve 14 and is combined in the pipe 13 with the part flowing through the heat accumulator 11, and is discharged in common therewith.

The heat carrier leaving the pipe 13 is thus already substantially cooled. Since this heat carrier generally consists of dust-laden exhaust gases, it must generally be subjected to a cleaning process before being expelled into the atmosphere.

In the period when no heat carrier is produced, the valve 7 is closed. During this time, air is sucked in from the atmosphere through a pipe 18 by a compressor or equivalent propelling means 17 driven by a motor 16, and is passed through a further pipe 19 provided with a shut-off valve 20 into the heat accumulator 11. The valve 12 arranged in the pipe 13 is closed during this period. While in the heat accumulator 11, the air takes up heat therefrom, and it serves as an intermediate heat carrier, whereafter it is passed through the pipe 9 into the heater 1, at least a part of the heat absorbed by this air from the accumulator being transferred to the working medium of the thermal power plant.

In the period during which the heat carrier is produced, the valves 7, 12 and 14 are open, while the valve 20 is closed. In the period during which no heat carrier is produced, on the other hand, the valves 20 and 14 are open, while the valves 7 and 12 are closed. Consequently, means adapted to be changed over are provided, which on the one hand permit the heat carrier produced to be passed partly to the heater 1 serving for the heating of the working medium of the thermal power plant and partly to the heat accumulator 11, and on the other hand permit a gaseous intermediate heat carrier to be subsequently passed through the heat accumulator 11 and the heater 1 for the working medium, so that this intermediate heat carrier yields heat absorbed from the heat accumulator to the working medium in the heater through the heat exchange walls, that is to say, the heater tubes.

In the illustrated installation, the change-over means furthermore permit of successively passing air taken from the atmosphere as intermediate heat carrier through the heat accumulator 11 and the heater 1.

In addition, a pipe 22 having a shut-off valve 21 therein is provided, which connects the pipe 10 with the atmosphere.

When the thermal power plant is operating normally, the valve 21 is closed both during the time when the heat carrier is produced and during the time when no heat carrier is produced.

However, it may happen that the thermal power plant is stopped for some reason. In this case, during the period of the production of the heat carrier the total quantity thereof must be passed through the heat accumulator in order to be sufficiently cooled to permit of subsequent cleaning, if necessary. The valve 14 is then closed. The valves 7 and 12, on the other hand, remain open. The valves 20 and 21 remain closed as during the operation of the thermal power plant.

In the period when no heat carrier is produced, on the other hand, the valves 7 and 12 are closed, and the valves 20 and 21 are opened. The air sucked in from the atmosphere is conveyed by the compressor 17 into the heat accumulator 11 and heated. However, after leaving the heat accumulator, it cannot flow through the heater 1 as in normal operation, since the valve 14 is closed, but the air leaving the heat accumulator is discharged directly through the pipe 22, by-passing the heater. In this operation, the heat accumulator 11 is cooled again to such an extent that it is in turn again ready at the commencement of the following period to absorb heat from the waste gases produced and fed through the pipe 8.

Such an arrangement has the advantage that even during periods in which it is not desired to utilize the heat contained in the intermittently produced heat carrier in a thermal power plant, this heat carrier is sufficiently cooled to enable it to be subjected, for example, to a subsequent cleaning. In such cases, it is advantageous not to employ water for this cooling as has hitherto frequently been the case, which is particularly important in cases where the penetration of water might interfere with the process in which the hot gases are produced, or might even cause explosions.

What is claimed is:

1. The combination of a closed-circuit thermal power-plant in which a gaseous working-medium circulates, said plant including a surface heat exchanger through which the plant receives heat energy, said plant serving to convert said energy into useful work, said exchanger having a heat delivery path for the circulation of a heating medium; an intermittent source of hot gas; means for propelling a gaseous secondary heat convector; a heat accumulator comprising a heat storing mass and means defining a heat recovery flow path for gaseous medium in heat exchange relation with said mass; a first flow connection between one end of said heat recovery flow path and one end of the heat delivery path through said heat exchanger; a second flow connection between said source of hot gas and said first flow connection; a third flow connection between the delivery of said propelling means and the other end of said heat recovery flow path; discharge connections, one associated with said other end of the heat recovery flow path and another associated with the other end of the heat delivery path; first valve means controlling the flow of hot gas through said second flow connection; and second valve means for the control of discharge from said other end of the heat recovery flow path.

2. The combination defined in claim 1, in which the secondary heat convector is air drawn from the atmosphere by said propelling means.

3. The combination defined in claim 2 in which a third valve means is arranged to control flow through said propelling means and the connections are such that when the first and second valve means are open and the third valve means closed flows from said source are in parallel through the heat recovery path and the heat delivery path to discharge, and when the first and second valve means are closed and the third valve means is open, flow is from atmosphere, through the heat recovery flow path and heat delivery path in series to discharge.

References Cited in the file of this patent

UNITED STATES PATENTS

| | | |
|---|---|---|
| 1,940,371 | Royster | Dec. 19, 1933 |
| 2,495,604 | Salzmann | Jan. 24, 1950 |